(12) United States Patent
Oveyssi

(10) Patent No.: US 8,422,175 B1
(45) Date of Patent: Apr. 16, 2013

(54) DISK DRIVE APERTURE CHANNEL

(75) Inventor: Kamran Oveyssi, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 246 days.

(21) Appl. No.: 12/895,625

(22) Filed: Sep. 30, 2010

(51) Int. Cl.
  *G11B 33/14* (2006.01)
  *H05K 7/20* (2006.01)
  *G11B 21/08* (2006.01)

(52) U.S. Cl.
  USPC .................................. 360/264.8; 360/97.12

(58) Field of Classification Search ............... 360/97.12, 360/264.7, 264.8
  See application file for complete search history.

(56) References Cited

U.S. PATENT DOCUMENTS

| | | | | |
|---|---|---|---|---|
| 4,819,110 | A * | 4/1989 | Funai et al. ................. | 360/264.7 |
| 5,597,063 | A * | 1/1997 | Bogle et al. ................. | 198/635 |
| 5,905,607 | A * | 5/1999 | Briggs et al. ............... | 360/264.8 |
| 6,304,421 | B1 * | 10/2001 | Brown ....................... | 360/264.8 |
| 6,661,603 | B1 * | 12/2003 | Watkins et al. ............. | 360/99.2 |
| 6,970,329 | B1 * | 11/2005 | Oveyssi et al. ............ | 360/264.8 |
| 7,038,886 | B1 * | 5/2006 | Chang et al. ............... | 360/264.7 |
| 7,057,852 | B1 | 6/2006 | Butler et al. | |
| 7,178,432 | B1 | 2/2007 | Han et al. | |
| 7,209,317 | B1 * | 4/2007 | Berding et al. ............ | 360/97.11 |
| 7,458,282 | B1 | 12/2008 | Wuester, Sr. et al. | |
| 7,506,553 | B1 | 3/2009 | Panyavoravaj | |
| 7,549,204 | B1 | 6/2009 | Vangal-Ramamurthy et al. | |
| 7,619,854 | B2 * | 11/2009 | Watanabe et al. .......... | 360/97.12 |
| 2007/0025024 | A1 * | 2/2007 | Iwahara .................... | 360/264.8 |
| 2007/0186401 | A1 | 8/2007 | Busch et al. | |

* cited by examiner

*Primary Examiner* — Julie Ann Watko

(57) ABSTRACT

Embodiments described herein relate to a disk drive coupler for reducing particulates in a disk drive. In some embodiments, the disk drive includes a first component having a top surface and a bottom surface, the first component defining an aperture with an interior surface between the top surface and the bottom surface, and a channel on at least one of the top surface, the bottom surface, and the interior surface. In some embodiments, the disk drive coupler includes a fastener configured to be received within the aperture and is configured to secure the first component to a second component. The channel is configured to permit the drawing of air from at least one of the aperture, the top surface, and the bottom surface of the first component before and after the fastener secures the first component to the second component.

16 Claims, 8 Drawing Sheets

DISK DRIVE APERTURE CHANNEL

BACKGROUND

Hard disk drives, (HDD) are often used in electronic devices, such as computers, to record data onto or to reproduce data from a recording media, which can be a disk having one or more recording surfaces. The HDD also includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
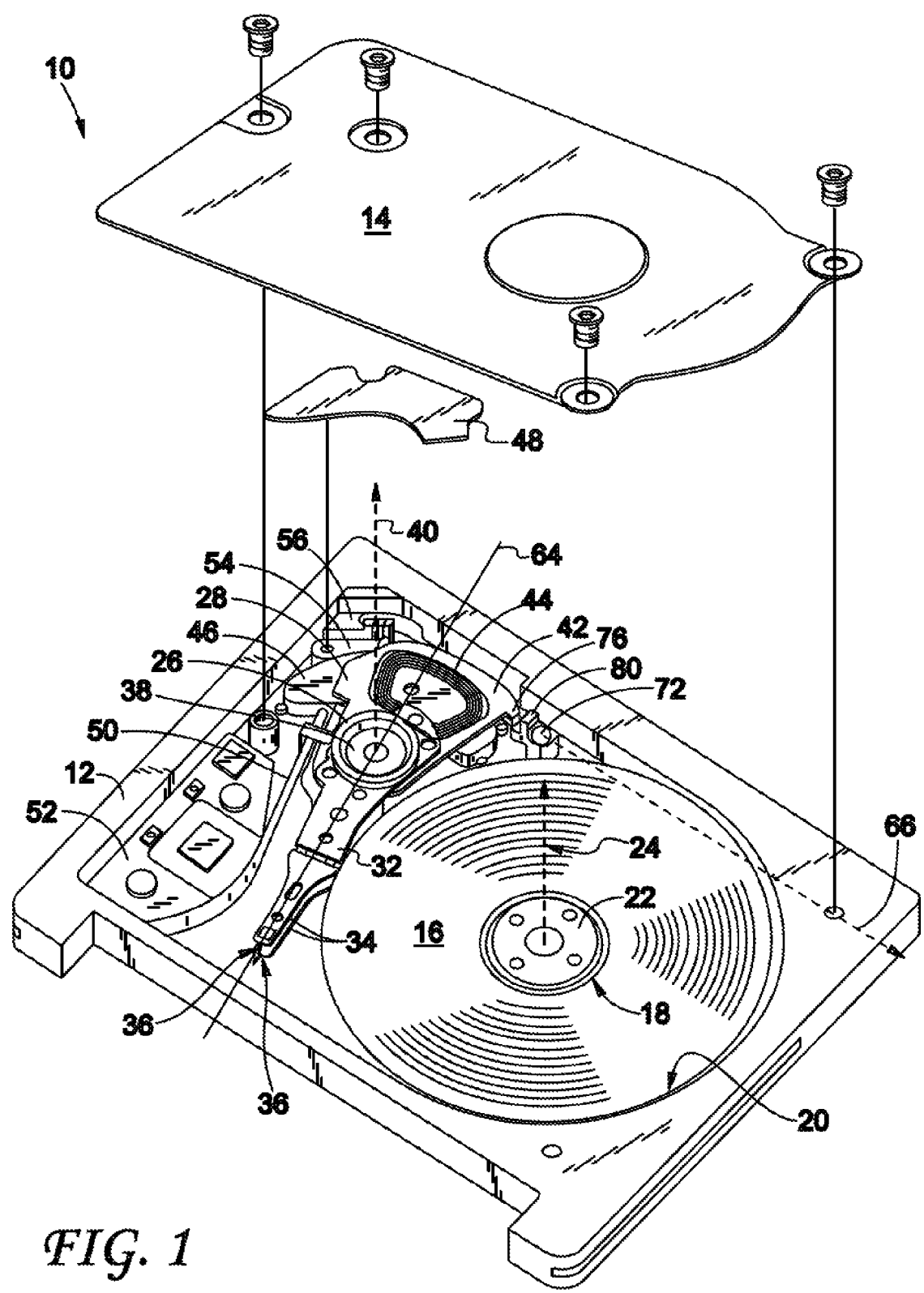
FIG. 1 depicts a perspective view of a disk drive in accordance with one embodiment.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a coupling portion 56 that is coupled to the disk drive base 12. The latch 54 further includes a latching portion 58 (FIG. 2) that, with the coupling portion 56, is configured to limit rotational movement of the actuator 28. Although the latch 54 is depicted as being located in a corner of the base, the latch 54 could be located in other portions of the disk drive, as shown in other embodiments described herein, and still perform its functions. Further embodiments and description of the latch 54 will be provided herein.

When the actuator 28 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity of the actuator arm 32 relative to the disk 16 can adversely affect the performance of the HDD. For example, vibration of the actuator 28 can result in variations in the spacing between the head element and media. Additionally, irregular movement of the disk 16, or vibrations caused by unbalanced rotations, can result in variations in the spacing between the head element and the disk 16, or media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Figure 2:
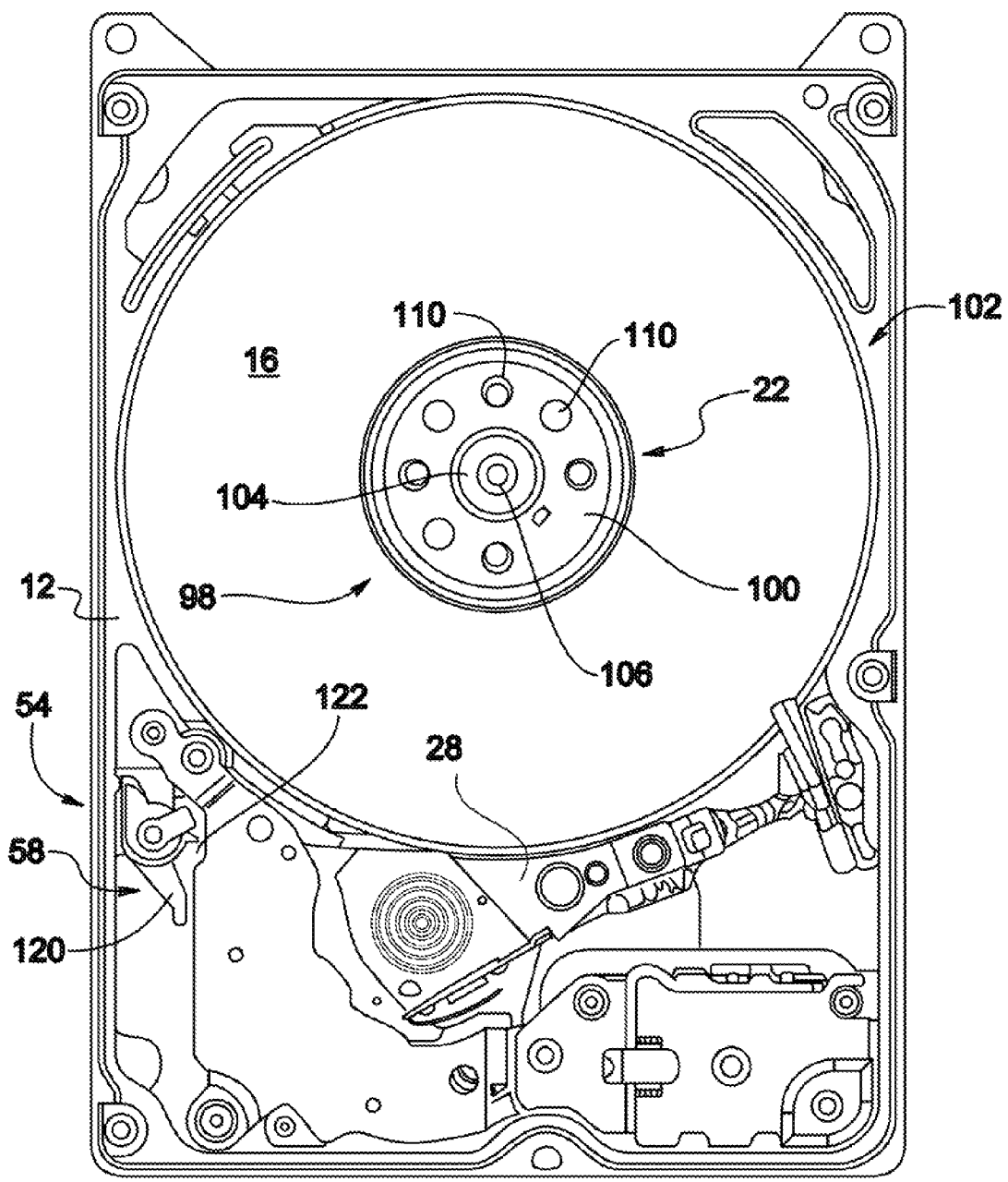
FIG. 2 illustrates a top view of a disk drive in accordance with one embodiment.

Each disk 16 is mounted on a rotatable hub 98 connected to the spindle motor 22 and is secured to the rotatable hub by a disk clamp 100, as illustrated in FIG. 2. Some disk drives 10 include a plurality of disks 16 to provide additional disk surface for storing greater amounts of data. The resulting combination is referred to herein as a motor/disk assembly or as a disk pack 102.

Multiple data storage disks 16 can be mounted on the rotatable hub 98 in vertically and substantially equally spaced relations. One or more bearings 104 are disposed between a motor or spindle shaft 106 and the rotatable hub 98, which is disposed about and rotatable relative to the spindle shaft 106. Electromagnetic forces are used to rotate the hub 98 about the stationary shaft 106 at a desired velocity. Rotational movement of the hub 98 is translated to each of the disks 16 of the disk pack 102, causing the disks 16 to rotate with the hub 98 about the shaft 106.

The disks 16 are rotated about the shaft 106 at a high rate of speed, and consumer demand for quicker data retrieval can result in increased rotational speed of the hub 98 and the disks 16 to provide reduced time in accessing data. Even minor imbalances of the rotating motor/disk assembly 102 can generate significant forces that can adversely affect the ability to accurately position the head 36 relative to the desired track of the corresponding disk 16 while reading from or writing to the disk 16. Excessive imbalance can degrade the disk drive performance not only in terms of read/write errors, but also in terms of seek times. Excessive imbalance may result in an undesirable acoustic signature and may even result in damage or excessive wear to various disk drive components, particularly if the actuator 28 is permitted to operate and travel over the imbalanced disk 16 surfaces or during non-operational periods.

The inner diameter 18 of each disk 16 is slightly larger in diameter than an outer periphery of the spindle motor hub, or rotatable hub 98, in order to allow the disks 16 to slip about the spindle motor hub 98 during installation. During assembly, the disks 16 may be positioned in an inexact concentric manner about the spindle motor hub 98. In fact, in some instances, the disks 16 may be intentionally biased against the spindle motor hub 98. This inexact concentric relationship between the disk 16 and the motor hub 98 results in the disk pack 102 becoming imbalanced. This imbalance can be manifest in at least two respects.

First, the rotating mass of each disk 16 results in a centrifugal force radially extending in a direction from the axis of rotation 24 in a plane orthogonal to the axis of rotation 24. This can be referred to as a single plane or "static" imbalance. Second, the same centrifugal force also results in a moment about an axis, extending from the axis of rotation 24, as a result of the coupling of two different planes of imbalance, each of which are orthogonal to the axis of rotation 24. This can referred to as a dual plane, two plane, or "dynamic" imbalance.

Balancing of the disk pack 102 is preferably conducted, for example, by the manufacturer or during an assembly process, prior to shipping the drive 10 to the consumer. Single plane balancing of the disk pack 102 can include attaching one or more weights to one side of the disk pack 102. Not all imbalances may be alleviated to the desired degree by balancing within a single plane. Dual plane balancing of the disk pack 102 can be achieved by attaching one or more weights at two different elevations along the axis 24 corresponding with vertically spaced reference planes in an attempt to improve upon the potential inadequacies of a single plane balance.

Balancing the disk pack 102 can be accomplished by attaching one or more weights to a central portion of the disk pack 102. For example, as illustrated in FIG. 2, the disk pack 102 can have a portion that holds the one or more weights or to which the one or more weights attach. FIG. 2 illustrates a disk pack 102 having a rotatable hub 98 that includes a disk clamp 100 having a plurality of disk clamp apertures 110 positioned circumferentially about a central portion of the disk pack 102.

Another source of vibrations during disk operation is disk deformations and irregularities that are caused when non-operational shock subjects the disk 16 to very high inertial forces. When a disk 16 is subjected to such non-operational shocks, the disk can experience crack initiation, material yielding, and development of uneven surfaces. These changes in disk structure and profile can result in reduced disk performance because of damage to the recording surfaces of the media or because of vibrations caused by the disk deformations and irregularities.

When the disk 16 is subjected to high inertial forces, such as those experienced during a non-operational shock event, the disk 16 can deflect excessively and, in some instances, may contact the base 12. This contact can cause media damage, especially at the outer diameter 20 of the disk 16, and can reduce the ability of the heads 36 to read and/or write to the location of the disk 16 that has been damaged.

Additionally, if the actuator 28 is permitted to rotate during a non-operational period, there is a risk that the drive 10 may experience in non-operational shock that causes the heads 36 or other portions of the actuator 28 to contact the disks 16 and damage the recording surface of the disk 16 or the actuator 28 itself. Such contact can result in increased operational vibrations and actual damage to operational components of the drive 10. Accordingly, the latch 54 of the drive 10 preferably restricts movement of the actuator 28 when the drive 10 is in a non-operational mode.

FIG. 2 illustrates an embodiment of the latch 54, including a latching portion 58 that engages the actuator 28 during non-operational modes of the disk drive 10. A latching portion 58 includes a latch engagement member 120 that contacts an actuator engagement member 122 during non-operational modes. As will be explained further below, when the drive 10 changes from a non-operational mode to an operational mode, the latch 54 rotates such that the latch engagement member 120 no longer blocks or contacts the actuator engagement member 122, thereby permitting rotational movement of the actuator 28.

Vibrations of the disk drive can also result in the dislodging or dispersion of particulates that are generated during the assembly process. When the disk drive 10 is assembled, fasteners, such as screws, bolts, clamps, and pins, are used to secure portions of the disk drive 10 together. When these components make contact, particulates can be generated from and dispersed in the disk drive 10. These particulates can be dislodged from their original location or dispersed throughout the disk drive 10 by vibrations caused by normal operation or by both operational and non-operational shocks.

During operation of the disk drive 10, the actuator arm 32 rotates the disk drive heads 36 over the surface of the disks 16 at high speeds. In some embodiments, the heads 36 are positioned within microns of the disk surface. With this tight clearance between the heads 36 and the disk surface, particulates that propagate onto the disk surface can damage the heads 36 or scratch the surface of the disks 16. This damage can cause complications during operation of the disk drive 10 and can reduce efficiency of the disk drive 10. In some instances, the damage caused by the particulates can permanently damage the disk drive 10 and can, in some instances, render the disk drive 10 inoperable.

Particulates can be generated during the assembly process by the insertion of one component into another component or by the sliding or rubbing between components. One process that can be the source of particulates includes the fastening of bolts or screws. For example, as a screw is threaded into a threaded bore, the contact between the threads of the screw and that of the bore can generate particulates. Additionally, if the screw is inserted through an aperture of a first component and into a threaded bore of a second component, particulates can be generated during the advancement of the screw through the aperture, during the threading engagement of the screw and threaded bore, and during the tightening and securement of the first component with the second component. These particulates can be deposited during the assembly process under a head of the fastener, between the components being secured, within the aperture, and within the threaded bore.

For many applications, the particulates that are generated and remain within the threaded bore are of less threat when the threaded bore does not extend through its component. In such instances, the threaded bore acts to contain the particulates. However, complications can arise with threaded bores that extend through its component, as the particulates can fall through the component and into the drive 10.

Particulates formed during the assembly process can be dislodged later during shocks or normal vibrations. These particulates can then migrate throughout the drive and can adversely affect operation of the disk drive 10.

Some embodiments described herein provide apparatus and methods for reducing the amount of particulates that remain within a disk drive following the assembly process. In some embodiments, components that are coupled together by a fastener extending through an aperture in one of the components include a channel along the aperture. The channel can provide a pathway for drawing air from the aperture and components during and after securing the components together. As the air is drawn through the aperture, particulates that are created by the assembly process can be drawn through the channel and removed from the disk drive.

Figure 3:
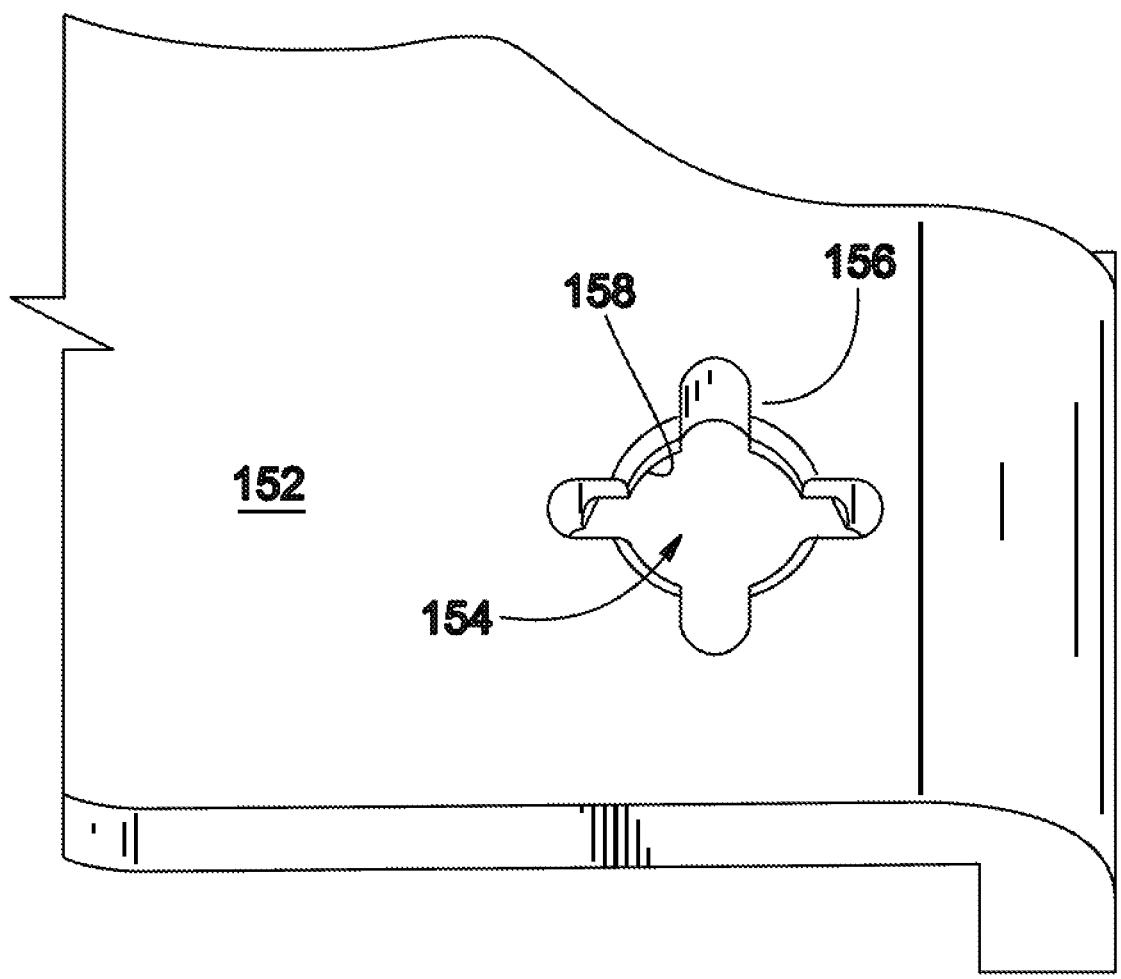
FIG. 3 illustrates a top view of a disk drive component with an aperture having embodiments of the present disclosure.

FIG. 3 depicts one embodiment of a component having an aperture with embodiments described herein for providing a channel for removing particulates from the disk drive. Illustrated in FIG. 3 is a top view of a VCM plate 152, which can be secured in the disk drive over a portion of the actuator 28. The VCM plate 152 includes an aperture 154 through which a fastener is extended to secure the VCM plate 152 to the disk drive base 12. Some embodiments provide that the aperture 154 includes at least one channel 156 extending along an inner surface 158 of the aperture 154.

Depicted in FIG. 3 is a VCM plate 152 that includes four channels 156 equally spaced about a perimeter of the aperture 154. In some embodiments, when the component includes a plurality of channels extending along the aperture 154, each of the plurality of channels 156 can be positioned equidistant from other channels 156 about the aperture 154. In some embodiments, positioning of the channels can be adjusted. For example, in some embodiment, the channels can be positioned in locations that are not equidistant from other channels 156. This may be advantageous in situations where it may be known or expected to have certain particulates gather at a location about the aperture. Additionally, it may be advantageous to have the channels positioned in locations not equidistant from other channels 156 when structures at or near the aperture may make it difficult or impractical to have the channels positioned equidistant about the aperture 154.

Figure 4:
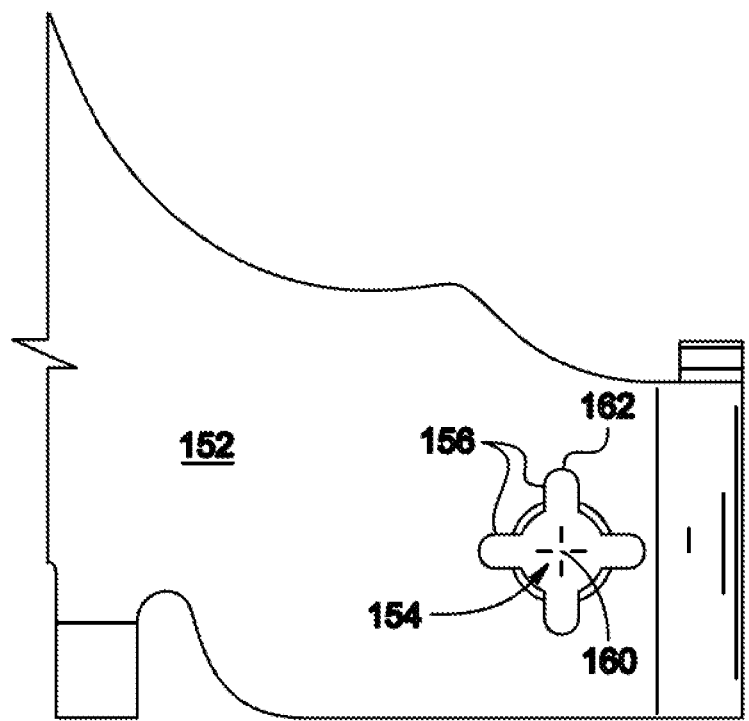
FIG. 4 illustrates a bottom view of a disk drive component with an aperture having embodiments of the present disclosure.

FIG. 4 illustrates a bottom view of the VCM plate 152. Depicted in the figure is the aperture 154 having a plurality of channels 156 extending along the aperture 154. In FIG. 4, the channels are depicted as extending in a straight radial direction from a central axis 160 defined by the aperture 154. The channels 156 are also illustrated as having a rounded channel end 162. In some embodiments, the channels 156 can extend in directions that are not normal to the axis 160 or along a straight radial direction from the axis 160. For example, the channels 156 can be angulated relative to the axis 160, and the channels 156 can extend along a direction that is transverse to a radial direction of the axis 160.

Figure 5:
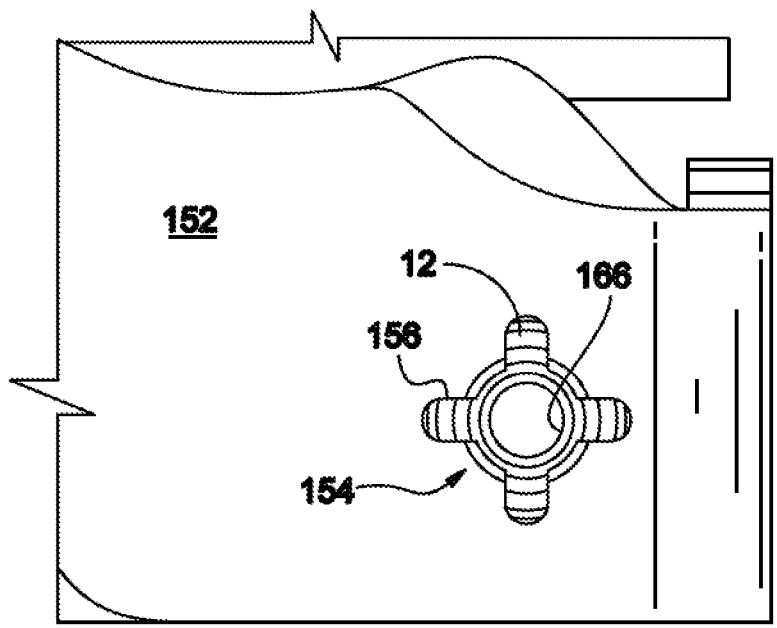
FIG. 5 illustrates a top view of a disk drive component with an aperture having embodiments of the present disclosure in position to be coupled to a second component.

FIG. 5 depicts embodiments of the VCM plate 152 in position to be coupled to a threaded bore 166 of the base 12. As is illustrated in the figure, the threaded bore is aligned with the aperture 154 prior to inserting a fastener. The channels 156 preferably extend beyond the outer perimeter, diameter, or cross-sectional dimension of the threaded bore. In this configuration, as the fastener is received by the aperture 154, particulates that are formed by contact between the aperture 154 and the fastener can drop to a position either within or around the threaded bore 166. A vacuum can be drawn through the channels 156 to draw air and the particulates up through the channels 156 and out of the disk drive 10.

As the fastener is received by the threaded bore 166, particulates may be formed by the mating threads of the fastener and the bore 166. These particulates will fall either within the bore or about the perimeter of the threaded bore 166. Because the channels 156 extend beyond the outer perimeter or cross-sectional dimension of the threaded bore 166, air drawn through the channels 156 can draw particulates from within the aperture and from between the VCM plate 152 and base 12, and these particulates can be removed from the disk drive 10.

Figure 6:
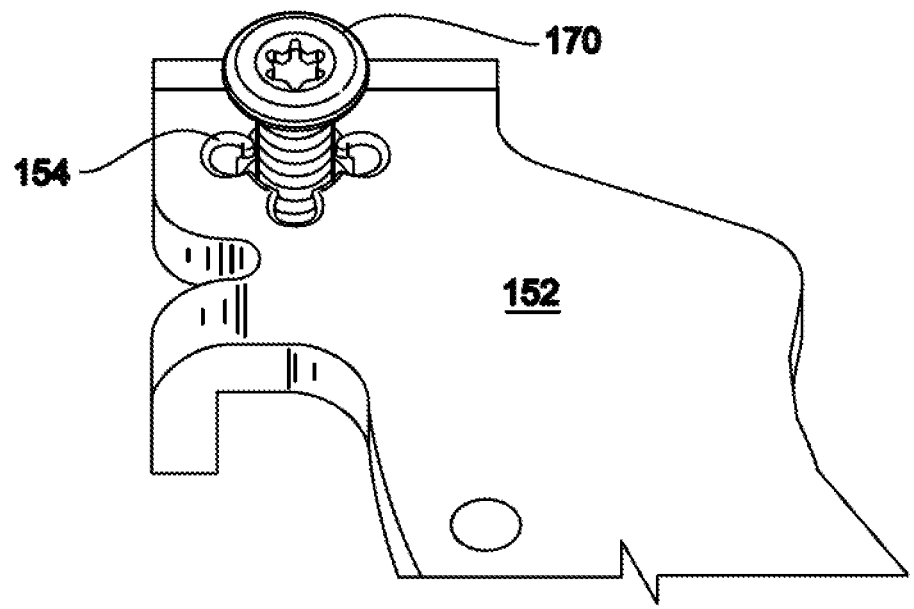
FIG. 6 illustrates a top view of a disk drive component with an aperture having embodiments of the present disclosure with a fastener extending through the aperture to couple the component to a second component.

FIG. 6 illustrates a top view of the VCM plate with an aperture 154 having embodiments of the channels 156 described herein. The figure also illustrates a fastener 170 in place to hold the plate 152 secured to the base 12. In some embodiments, the channels 156 extend radially beyond an outermost cross-sectional measurement of the fastener. For example, in the figure, the channels extend beyond the outermost edge of the head of the fastener 170. This configuration increases the pathway of air to be drawn through the channels 156 during securement of the fastener 170 and provides access, from the top portion of the plate, to draw air through the channels 156 after the fastener 170 has been tightened down. This facilitates removal of particulates located between the VCM plate 152 and the base 12, between the inner surface 158 of the aperture 154 and the fastener 170, and between a head portion of the fastener 170 and the VCM plate 152.

Although the description herein has explained principles of the disclosure in connection with a VCM plate, some embodiments provide that the principles of the disclosure can be applied with other components of the disk drive. For example, there are many components that are secured in place within the disk drive by a screw, bolt, pin, or other fasteners. Embodiments of the channels described herein can be applied to these other applications.

Some embodiments described herein disclose a disk drive coupler for reducing particulates in a disk drive. In some embodiments, the disk drive includes a first component having a top surface and a bottom surface, the first component defining an aperture with an interior surface between the top surface and the bottom surface, and the first component having a channel on at least one of the top surface, the bottom surface, and the interior surface. In some embodiments, the disk drive coupler includes a fastener configured to be received within the aperture and is configured to secure the first component to a portion of a disk drive. In some embodiments, the channel of the first component is configured to permit the drawing of air to the top surface of the first component from at least one of the aperture and bottom surface of the first component when the fastener secures the first component to the portion of the disk drive.

In some embodiments, the fastener 170 is inserted through the aperture 154 of a first component and secured into a threaded bore of a second component. Following securing of the first component with the second component by the fastener 170, air can be drawn through the channels 156 to remove particulates. In some embodiments, air can be drawn while the two components are being secured together. For example, in some embodiments, air can be drawn through the channels 156 while the two components are placed together. Additionally, air can be drawn through the channels 156 while the fastener 170 is inserted into the aperture 154, and air can be drawn through the channels 156 while the fastener 170 is threaded into the threaded bore. Accordingly, the channels 156 permit air to be drawn through the channels 156, thereby removing particulates, before, during, and after securement, or coupling, of components.

Figure 7:
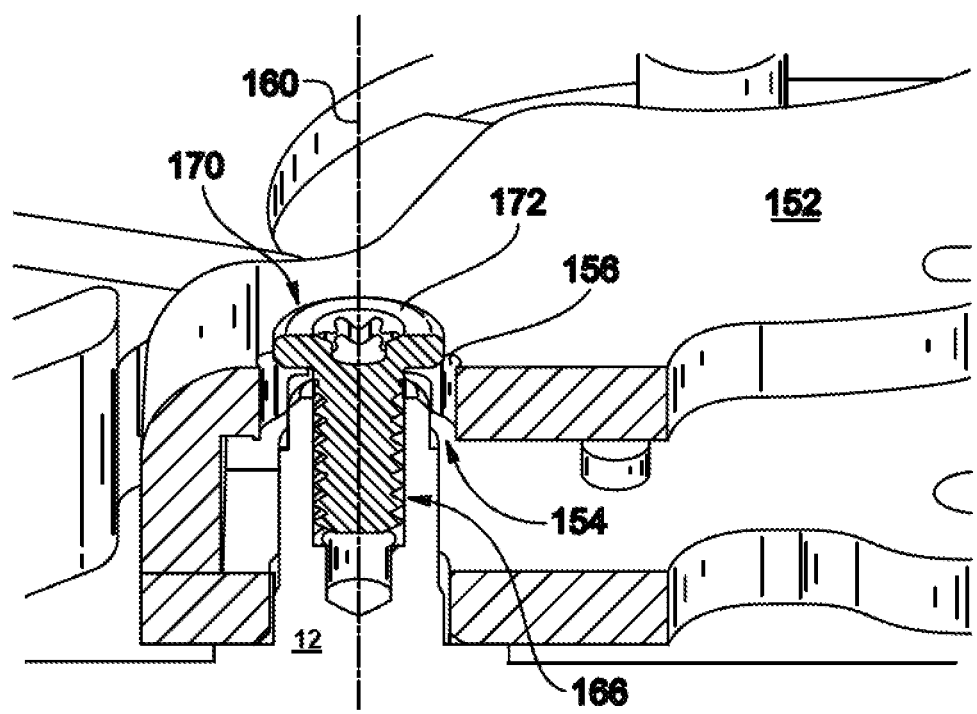
FIG. 7 illustrates a partial cross-sectional view of a disk drive component with an aperture having embodiments of the present disclosure and a fastener extending through the aperture to couple the component to a second component.

FIG. 7 illustrates a partial cross-sectional view of embodiments of the disclosure, showing a VCM plate 152 having an aperture 154 extending therethrough. A fastener 170, shown extending through the aperture 154, is shown threaded into a threaded bore 166 of the base 12. The plate 152 includes a plurality of channels 156 extending along the aperture 154. As explained above, the channels 156 can be used to drawn air therethrough for removing pariculates deposited around the threaded bore166, within the aperture 154, under a head 172 of the fastener 170, or elsewhere in the assembly of the disk drive 10.

Figure 8:
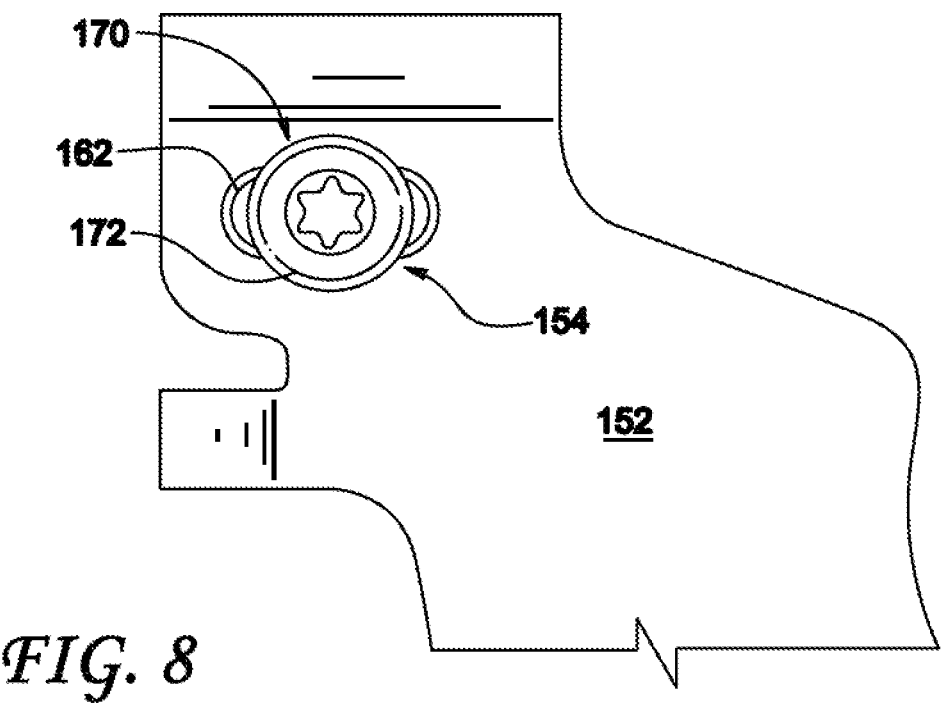
FIG. 8 illustrates a top view of embodiments of the present disclosure.

FIG. 8 depicts embodiments of the disclosure having a plurality of channels 156 extending along an aperture 154 with a fastener 170 extending through the aperture 154. Although FIG. 8 illustrates the embodiments with diametrically opposed channels 156, the channels 156 can be positioned at different relative orientations. For example, the channels 156 can be positioned on opposite sides, as illustrated in FIG. 8, and in some embodiments, the channels 156 can be positioned on the same side. The channel ends 162 preferably extend radially beyond the largest cross-sectional dimension of the fastener head 172, such that the channels 156 are exposed to a top surface of the plate 152. Accordingly, a vacuum can be applied to the top surface of the plate, and air can be drawn through the channels 156 to remove particulates from the disk drive 10.

Figure 9:
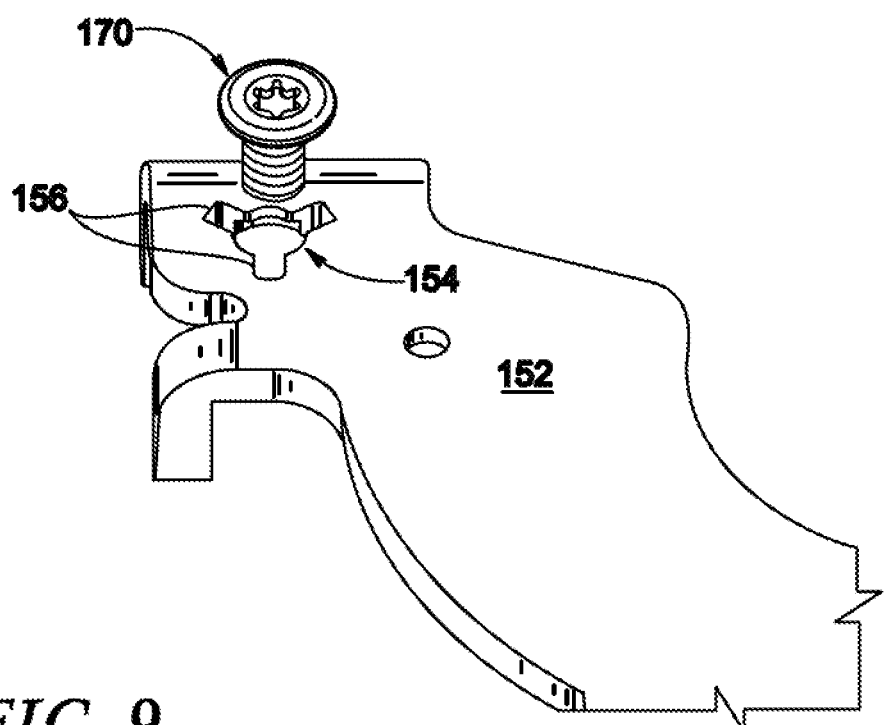
FIG. 9 illustrates a top view of embodiments of the present disclosure.

FIG. 9 depicts embodiments of the present disclosure having three channels 156 extending through the plate 152 for removing particulates. In some embodiments, as illustrated, the channels 156 can be spaced about 120 degrees apart. In further embodiments, the channels 156 can be spaced at intervals different that 120 degrees.

Figure 10:
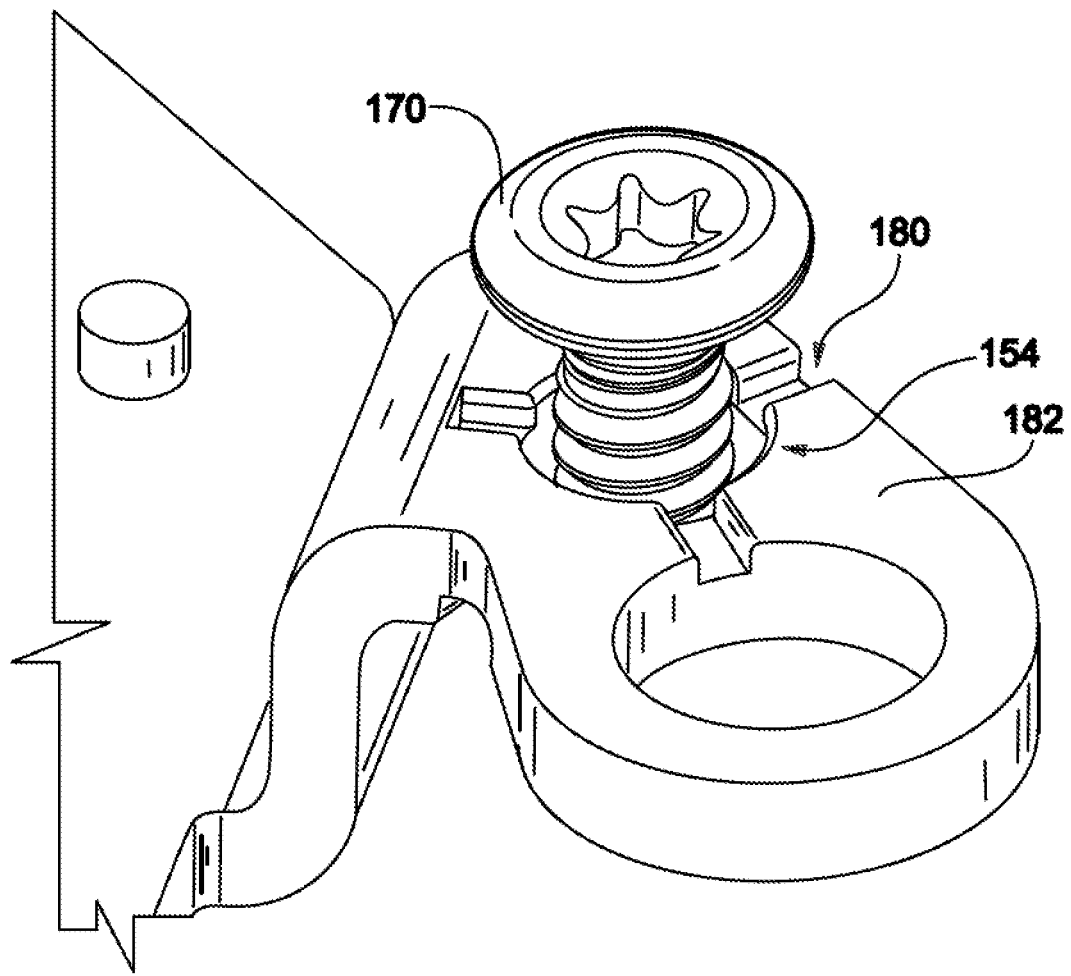
FIG. 10 illustrates a top perspective view of a disk drive component with an aperture having embodiments of the present disclosure and a fastener extending through the aperture.

FIG. 10 illustrates embodiments of the disclosure in which the channels are provided as recesses 180 positioned about the aperture 154. In these embodiments, the recesses 180 can provide a pathway through which air can be drawn before, during, and after securement with a fastener 170. As depicted in FIG. 10, in some embodiments, the recesses 180 extend in radial extent from the aperture to a radial distance beyond the greatest cross-sectional dimension of the fastener 170. Accordingly, when the fastener is secured, the recesses 180 can provide a pathway through which particulates can be removed from the disk drive 10.

The pathways provided by the recesses are preferably sufficient to remove particulates formed during and after the assembly process. The recesses 180 form a nonlinear pathway for removing the particulates. This configuration is in contrast to other embodiments described herein, which provide pathways that are substantially linear or are substantially aligned with, or parallel to, the central axis of the aperture 154. As illustrated in FIG. 10, the recesses 180 form pathways, or channels, that are transverse to, or are in a direction that will intersect with, the central axis of the aperture 154. Although in some embodiments, the recesses 180 may be configured to extend along directions that do not directly intersect with the axis of the aperture 154, these can be described as extending in a direction that is transverse with the aixs, as it is not parallel with the axis of the aperture 154.

Figure 11:
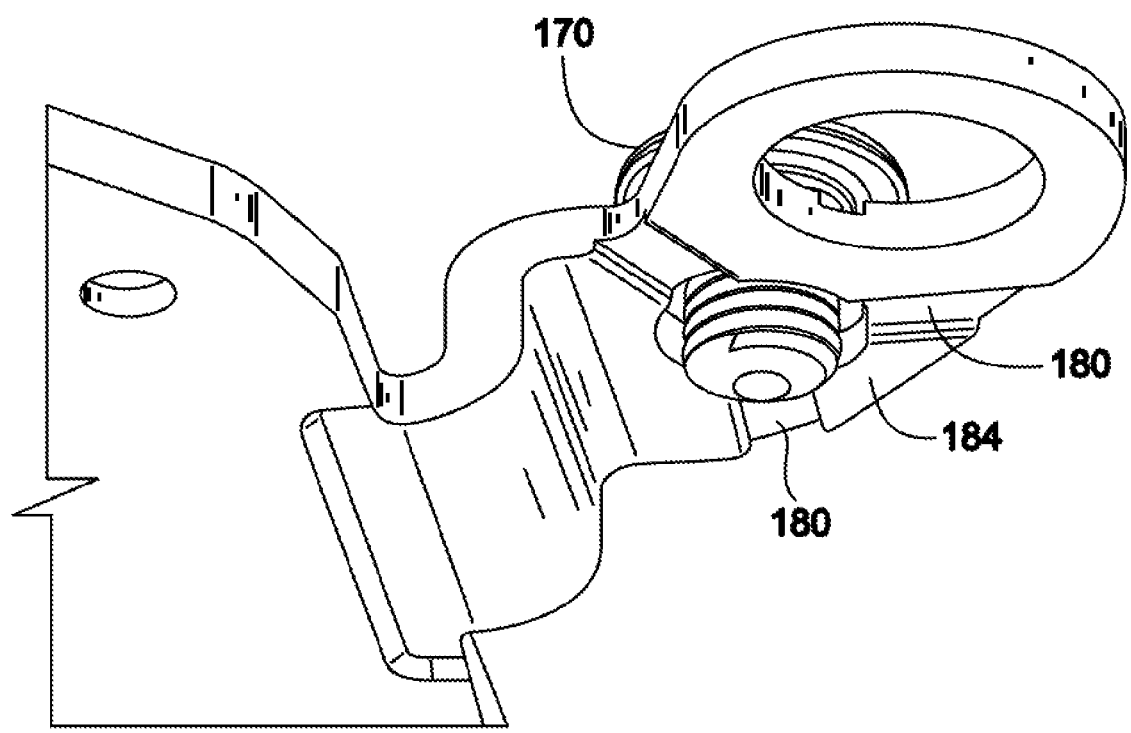
FIG. 11 illustrates a bottom perspective view of a disk drive component with an aperture having embodiments of the present disclosure and a fastener extending through the aperture.

FIG. 10 illustrates the recesses 180 extending along a top surface 182 of the component that is secured by the fastener 170. FIG. 11 illustrates recesses 180 along a bottom surface 184 of the component that is secured by the fastener 170. The recesses 180 along the top surface can be used in conjunction with or independent of the recesses 180 that extend along the bottom surface 184. In some embodiments, the recesses 180 along the top surface 182 and the recesses along the bottom surface 184 are used together to form multiple pathways through which particulates can be removed from the disk drive 10. Although FIGS. 10 and 11 depict three recesses on to top surface and three recesses on the bottom surface, in some embodiments, there is one recess 180, and in further embodiments there are two recesses 180. In some embodiments there are more than three recesses 180, and in some embodiments, the number of recesses on the top surface is different from the number of recesses on the bottom surface. Accordingly, the recesses 180 can form at least one nonlinear pathway through the component, or VCM plate in some embodiments described above, through which air can be drawn to remove particulates.

The recesses 180, in some embodiments are stamped during the manufacture of the corresponding components, and in some embodiments, the recesses can be milled or otherwise cut from the component.

Some embodiments herein describe a disk drive that includes a disk drive base having a coupling portion defining a bore and a VCM plate configured to be coupled to the disk drive base. The VCM plate preferably forms an aperture configured to receive a fastener to couple the VCM plate to the disk drive base via the coupling portion. In some embodiments, the VCM plate includes a channel formed along the aperture, the channel having a cross-sectional dimension greater than that of a head of the fastener such that air can be drawn through the channel when the fastener is received through the aperture and couples the VCM plate to the disk drive base.

In some embodiments, the channel comprises at least one slot extending along an inner surface of the aperture, and in some embodiments, the plate comprises a plurality of slots. For example, the channel can comprise 2, 3, 4, or more slots. Some embodiments provide that the channel includes at least one slot extending along the aperture in a direction substantially parallel with a central axis of the aperture. In some embodiments, the channel provides a direct pathway from a top surface of the plate to a bottom surface of the plate unobstructed by the fastener head when the fastener couples the plate to the disk drive base.

In some embodiments, the channel extends in a direction along the plate in a direction that is substantially transverse to a central axis of the aperture. For example, in some embodiments, the channel extends along a top surface, opposite the disk drive base, of the plate, and in some embodiments, the channel extends along a bottom surface of the plate adjacent to the coupling portion of the disk drive base.

Some embodiments described herein disclose a disk drive coupler for reducing particulates in a disk drive. In some embodiments, the disk drive includes a plate having a top surface and a bottom surface, the plate defining an aperture with an interior surface between the top surface and the bottom surface, and the plate having a channel on at least one of the top surface, the bottom surface, and the interior surface. In some embodiments, the disk drive includes a fastener configured to be received within the aperture and configured to secure the plate to a portion of a disk drive. In some embodiments, the channel of the plate is configured to permit the drawing of air to the top surface of the plate from at least one of the aperture and bottom surface of the plate when the fastener secures the plate to the portion of the disk drive.

In some embodiments, the disk drive coupler includes provides that the channel includes at least one slot extending along the aperture in a direction substantially parallel with a central axis of the aperture. Some embodiments provide that the channel extends in a direction along the plate substantially transverse to a central axis of the aperture. In some embodiments, the channel is configured to permit the drawing of air to the top surface both during and after the fastener secures the plate to the portion of the disk drive.

The disclosure herein includes a method for reducing particulates within a disk drive, the method including providing a first component of a disk drive that is to be couple to a second component of the disk drive by a fastener, the first component defining an aperture extending through a portion of the first component, the aperture comprising a channel with a greater cross-sectional dimension than a greatest cross-section dimension of the fastener. The method can include securing the first component to the second component by advancing the fastener through the aperture and drawing air from at least one of within the aperture and between the first and second components through the channel.

Some methods disclosed herein provide that air is drawn through the channel after securing the first component to the second component. Some methods provide that air is drawn through the channel during the securing the first component to the second component. Some methods provide that air is drawn along a path through the first component in a direction substantially parallel to a central axis of the aperture.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
   a disk drive base having a coupling portion defining a bore; and
   a VCM plate comprising a top surface and configured to be coupled to the disk drive base, the VCM plate forming an aperture configured to receive a fastener to couple the VCM plate to the disk drive base via the coupling portion, the VCM plate having a channel formed along the aperture, the channel having a cross-sectional dimension greater than that of a head of the fastener such that air can be drawn from the top surface immediately adjacent the fastener and through the channel when the fastener is received through the aperture and couples the VCM plate to the disk drive base.

2. The disk drive of claim 1, wherein the channel comprises at east one slot extending along an inner surface of the aperture.

3. The disk drive of claim 2, wherein the channel a plurality of slots.

4. The disk drive of claim 3, wherein the channel comprises 3 slots.

5. The disk drive of claim 2, wherein the channel comprises 4 slots.

6. The disk drive of claim 1, wherein the channel comprises at least one slot extending along the aperture in a direction that is substantially parallel with a central axis of the aperture.

7. The disk drive of claim 1, wherein the channel provides a pathway from the top surface of the plate to a bottom surface of the plate unobstructed by the fastener head when the fastener couples the plate to the disk drive base.

8. The disk drive of claim 7, wherein the channel extends along the top surface, opposite the disk drive base, of the plate.

9. The disk drive of claim 7, wherein the channel extends along a bottom surface of the plate adjacent to the coupling portion of the disk drive base.

10. The disk drive of claim 1, wherein the channel extends in a direction along the plate that is substantially transverse to a central as of the aperture.

11. A disk drive coupler for reducing particulates in a disk drive, the coupler comprising:
    a plate having a top surface and a bottom surface, the plate defining an aperture with an interior surface between the top surface and the bottom surface, the plate having a channel along at least the top surface, and the interior surface; and
    a fastener configured to be received within the aperture and configured to secure the plate to a portion of a disk drive;
    wherein the channel is configured to run from the aperture and to radially extend, within the top surface, beyond an outermost cross-sectional measurement of the fastener so as to permit the drawing of air to the top surface of the plate from at least the aperture when the fastener secures the plate to the portion of the disk drive.

12. The disk drive coupler of claim 11, wherein the channel comprises at least one slot extending along an inner surface of the aperture.

13. The disk drive coupler of claim 12, wherein the channel comprises a plurality of slots.

14. The disk drive coupler of claim 11, wherein the channel comprises at least one slot extending along the aperture in a direction that is substantially parallel with a central axis of the aperture.

15. The disk drive coupler of claim 11, wherein the channel extends in a direction along the plate that is substantially transverse to a central axis of the aperture.

16. The disk drive coupler of claim 11, wherein the channel is configured to permit the drawing of air to the top surface both during and after the fastener secures the plate to the portion of the disk drive.

* * * * *